United States Patent [19]
Suzuki

[11] Patent Number: 4,798,004
[45] Date of Patent: Jan. 17, 1989

[54] DISPLACEMENT DETECTING APPARATUS

[75] Inventor: Mikio Suzuki, Kawasaki, Japan

[73] Assignee: Mitutoyo Corporation, Tokyo, Japan

[21] Appl. No.: 61,070

[22] Filed: Jun. 10, 1987

[30] Foreign Application Priority Data

Jun. 13, 1986 [JP] Japan .............................. 61-90939[U]
Jun. 13, 1986 [JP] Japan .............................. 61-90940[U]
Jun. 18, 1986 [JP] Japan .............................. 61-92919[U]

[51] Int. Cl.[4] .............................................. G01B 3/22
[52] U.S. Cl. .................................................. 33/172 E
[58] Field of Search ............ 33/125 C, 143 L, 147 N, 33/172 E, 172 R, 178 E; 324/61 R

[56] References Cited

U.S. PATENT DOCUMENTS

| | | | |
|---|---|---|---|
| 3,867,037 | 2/1975 | Litke | 33/125 C |
| 3,987,552 | 10/1976 | Raiteri | 33/172 E |
| 4,114,280 | 9/1978 | Rucinski | 33/172 E |
| 4,227,308 | 10/1980 | Talansky et al. | 33/172 E |
| 4,505,042 | 3/1985 | Nishina | 33/172 E |
| 4,586,260 | 5/1986 | Baxter et al. | 33/125 C |
| 4,631,831 | 12/1986 | Bacher et al. | 33/172 E |

FOREIGN PATENT DOCUMENTS

| | | | |
|---|---|---|---|
| 3440221 | 5/1986 | Fed. Rep. of Germany | 33/172 E |
| 1009689 | 6/1952 | France | 33/172 E |
| 668679 | 3/1952 | United Kingdom | |
| 2135054 | 8/1984 | United Kingdom | |

Primary Examiner—William A. Cuchlinski, Jr.
Assistant Examiner—Patrick R. Scanlon
Attorney, Agent, or Firm—Flynn, Thiel, Boutell & Tanis

[57] ABSTRACT

The present invention relates to a displacement detecting apparatus incorporating therein a detector of phase discriminating type electrostatic capacity system. The detector includes a first and second sensing members, which are provided on sections movable relative to each other. The first sensing member is fixed on a support plate provided thereon with an indicator, and the second sensing member is provided on the side of a movable plate, such as a spindle supported by a case body. These sensing members are set at predetermined positions by a position checker allowing the visual inspection therethrough when the support plate is secured to the case body.

11 Claims, 4 Drawing Sheets

DISPLACEMENT DETECTING APPARATUS

BACKGROUND OF THE INVENTION

1. Field of the Invention

This invention relates to a displacement detecting apparatus incorporating therein a detector for detecting a relative moving displacement between a main body and a measuring element, and more particularly to improvements in a displacement detecting apparatus constructed such that assembling and adjustment of the detector can be facilitated.

2. Description of the Prior Art

For example, in contrast to a mechanical dial gauge wherein a spindle provided at the forward end portion thereof with a measuring element is slidably supported by a case body, an axial moving displacement of the spindle is converted into a rotary angle of a pointer through a mechanically enlarging mechanism, and a measured value is read in cooperation between this pointer and graduations, there has been known a displacement detecting apparatus, a so-called electronic dial gauge, wherein a moving displacement thereof is transduced into an electric signal by a detector incorporated therein, and the electric signal is electronically indicated in display means such as a digital and/or analog indicator. The latter has been widely spread due to its characteristics of high accuracy and easiness in reading.

The detectors of the displacement detecting apparatus of the type described are selected from the systems including a electrostatic capacity system, photoelectric system, magnetic system, contact point system and the like in accordance with the requisites such as the purpose of use, required measuring accuracy and further power consumption. However, any one of the systems has been constructed such that a first and a second sensing members are provided on a movable member such as the spindle and on a fixed member such as the case body in a manner to be movable relative to each other, respectively. Here, the first and second sensing members, being varied in shape due to the principle, system and the like, may be a pair of electrode plates opposed to each other, a main scale and an index scale having optical lattices associated with each other, a magnetic scale and a magnetic head, or an electrode plate and an electric contact. However, on condition that the positional relationship therebetween is regularly supported, the detector has been able to attain a resolution as high as an order of scores of - 10 $\mu$m.

However, with the conventional detector as described above, such a problem has been presented that assembling and adjusting of the positional relationship between the both sensing members are very difficult to do. This problem will hereunder be described in conjunction with an example of the detector 100 of a phase discrimination type electrostatic capacity system as shown in FIGS. 5 and 6. More specifically, as shown in FIG. 5, a plurality of sending electrodes 32 are arranged at regular intervals and in a predetermined pattern on the outer surface of a stationary plate 31 consisting of a stator or scale plate fixed to the side of a main body of apparatus such as a case body, and further, a belt-shaped receiving electrode 33 is provided in parallel to these sending electrodes 32. The respective sending electrodes 32 are applied thereto with AC voltage signals different in phase from one another.

A movable plate 41 consisting of a rotor or movable scale plate interlocked with a movable member such as a spindle is opposed to the stationary plate 31. On this movable plate 41, there are alternately provided along the moving direction of the movable plate 41 a coupling electrode 42 opposed to the sending electrodes 32 and the receiving electrode 33, and overlying both of the electrodes, and an earth electrode 43 opposed to the sending electrodes 32 and the receiving electrode 33, and also overlying both of the electrodes.

On the other hand, voltage signals associated with voltage signals of the respective sending electrodes 32 are induced to the receiving electrode 33 through the coupling electrodes 42, and accordingly, when the movable member is displaced in the state where AC voltages different in phase from one another are applied to the respective sending electrodes 32, an output signal commensurate to a displacement value of the movable member can be obtained from the receiving electrode 33. The phase of the signal outputted from the receiving electrode 33 is processed in an integrator 36 and compared with a predetermined reference phase, so that the displacement value of the movable member can be accurately measured without being affected by fluctuations and the like of a power voltage.

In the detector 100 constructed as described above, distances between the sending electrodes 32, the receiving electrode 33 and the coupling electrode 42 are important from the viewpoint of accuracy and should be held in the order of scores of $\mu$m, and the parallelism therebetween should not be fluctuated as well. Further, even if there may be a relative movement between the stationary plate 31 and the movable plate 41, the distances between the electrodes and the parallelism should be maintained. Moreover, for example, even if the parallelism between the both plates 31 and 41 is maintained, fluctuations in an area ratio of electrodes due to the inclinations and shifts in positions, etc. of the both plates 31 and 41 are not allowed. If these positional relationships are brought into disorder, then fluctuations in S/N ratio occur, and not only a predetermined detecting accuracy cannot be secured but also impossibility of detecting due to contact and the like between both plates 31 and 41 occurs. Here, in the recent years, during which necessity has been voiced for compactness of the displacement detecting apparatus in order to improve the portability and controllability. To assemble the displacement detecting apparatus with the aforesaid positional relationship is very troublesome in particular, and, by use of a method of monitoring output voltages and the like and disassembling the displacement detecting apparatus again for adjusting, while actual operations are carried out after the assembling, it is particularly difficult to obtain a resolution of less then 1 $\mu$m. This problem is true of not only the case of the detector of the electrostatic capacity system but also the case of the detectors of the above-described photoelectric system and the like.

Now, the following problem has been presented when the detector 100 of the aforesaid phase discriminating type electrostatic capacity system is provided on a displacement detecting apparatus such as the electronic dial gauge.

More specifically, when the detector 100 is adapted to well-known slide calipers, height gauge and the like, e.g. electronic slide calipers as shown in FIG. 7, the stationary plate 31 having the sending electrodes 32 and the receiving electrode 33 is secured to a slider 70 integrally formed thereon with an electronic display means 21, a movable plate 41 having a coupling electrode 42 and earth electrode 43 is mounted to a main scale 71, winding is made such that, in the slider 70, AC voltages are applied to the sending electrodes 32 and an output signal can be led out of the receiving electrode 33, and the earth electrode 43 is conductively wired to the main scale 71, so that a predetermined operation can be performed. However, since the movable plate 41 is projected in the diametral direction of the spindle in the case of the displacement detecting apparatus such as the electronic dial gauge, the earth electrode 43 and the spindle should have been wired by use of a cable surrounding the movable plate 41. As a consequence, in order to secure a sufficient space to allow the cable not to interface with any other assembly, the displacement detecting apparatus as a whole should have been large-sized. Furthermore, such a problem has been presented that a connecting terminal portion of the cable is dislodged due to the frequent vertical motions of the spindle. Further, due to the presence of the above-described problems, an ultra compact type displacement detecting apparatus, regardless of the above-described characteristics thereof, cannot adapt the detector of the phase discriminating type electrostatic capacity system from the restriction of the construction thereof, thus causing the hindrance against wide spreading of the displacement detecting apparatus with high accuracy.

SUMMARY OF THE INVENTION

The present invention has as its object the provision of a displacement detecting apparatus simplified in construction and capable of accurately and quickly performing positional adjusting between the both sensing members which constitute a detector and carrying out displacement detection with high accuracy.

The present invention, being based on the facts that the conventional assembling and adjusting of the detector have been performed while the assembling and disassembling of the displacement detecting apparatus are carried out and that a sensing member is provided thereon with a predetermined pattern of the sending electrodes and the like, is intended for that the positional relationship between the both sensing members can be adjusted by utilizing the aforesaid pattern, to thereby eliminate the above-described problems of the prior art.

To the above end, the present invention contemplates in a displacement detecting apparatus comprising a spindle having a measuring element slidably supported on a case body and a detector for detecting a moving displacement of this spindle in the axial direction thereof, wherein:

the detector includes a first sensing member supported by the case body formed thereon with the predetermined pattern and a second sensing member opposed to this first sensing member and integrally secured to the spindle;

the second sensing member is provided thereon with a position checker capable of visually inspecting the pattern of the first sensing member from a direction opposite to the first sensing member and ascertaining the positional relationship between the second sensing member and the first sensing member; and the first sensing member can be supported by the case body after the first sensing member is positionally adjusted with the second sensing member secured to the spindle.

As a consequence, the second sensing member is integrally secured to the spindle slidably mounted to the case body in parallel to the axial line of the spindle, the positional relationship between the first and second sensing members is adjusted by use of the position checker having a positioning reference line previously provided on the second sensing member, with the predetermined patterns being visually inspected, and the first sensing member is supported on the case body, so that the positional relationship between the both sensing members can be easily and quickly established.

BRIEF DESCRIPTION OF THE DRAWINGS

FIG. 2 is a perspective view showing the essential portions of the positioning means and the like;

DETAILED DESCRIPTION OF THE PREFERRED EMBODIMENT

One embodiment of the present invention will hereunder be described with reference to the accompanying drawings.

Figure 5:
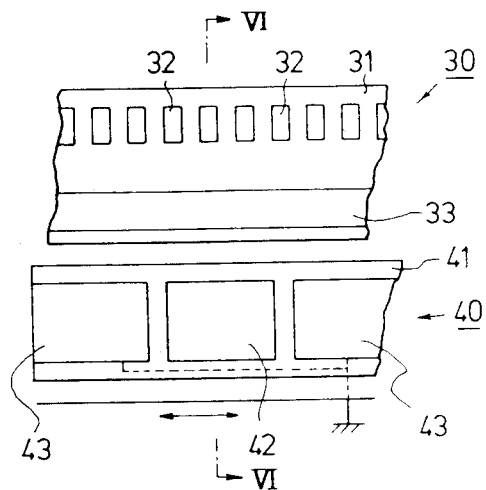
FIG. 5 is a plan view partially showing the first and second sensing members in the conventional example.
Figure 6:
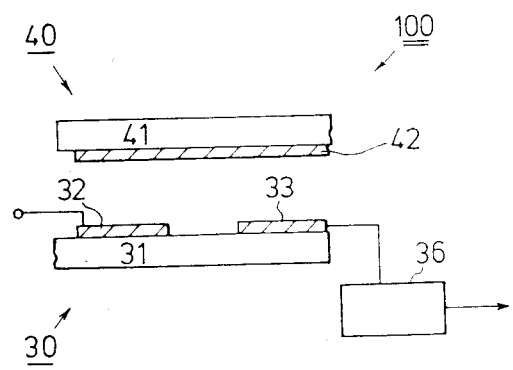
FIG. 6 is a sectional side view taken along the line VI—VI in FIG. 5.
Figure 7:
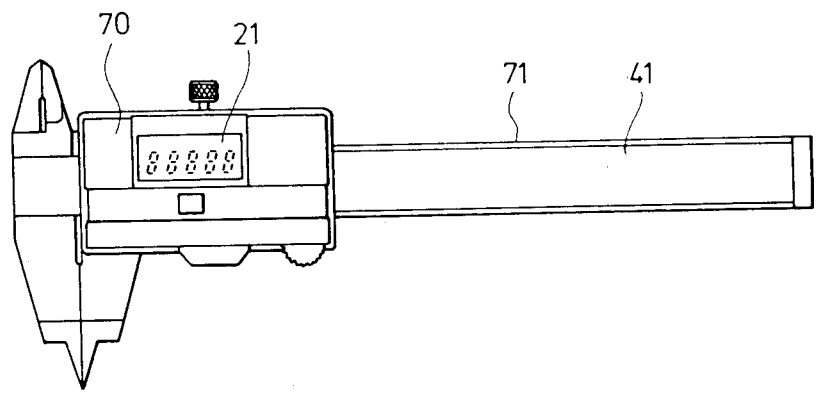
FIG. 7 is an appearance of another displacement detecting apparatus of the prior art.

The displacement detecting apparatus in this embodiment generally has a form of the electronic dial gauge, in which the detector of a phase discriminating type electrostatic capacity system is adapted, being shown in FIGS. 1 through 4. Incidentally, in the construction of the detector, the same reference numerals indicating the parts in the conventional construction shown in FIGS. 5 and 6 are used to designate the same or similar parts, so that the detailed description is simplified or omitted.

Figure 4:
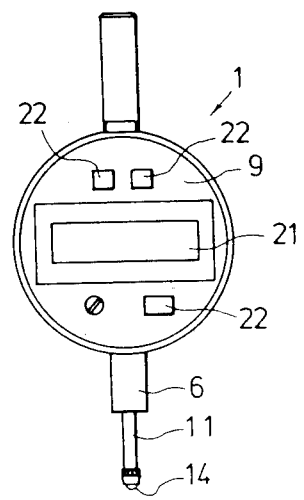
FIG. 4 is a general appearance thereof.

Now, the displacement detecting apparatus, as the appearance thereof is shown in FIG. 4, a spindle 11 is axially (vertically in the drawing) slidably provided on a case body 1 through a stem 6, an outer frame 9 having display means 21, switches 22 and the like is rotatably provided on the case body 1, and, when the spindle 11 is moved in the vertical direction with a measuring element 14 provided at the forward end portion of the spindle 11 being in contact with an article to be measured, not shown, a measured value can be read by display means 21 as a digital and/or an analogue values. For this, the case body 1 incorporates therein a first sensing member 30, a second sensing member 40, positioning means 50, parallelism adjusting means 60 and the like, which constitute the detector 100.

Figure 1:
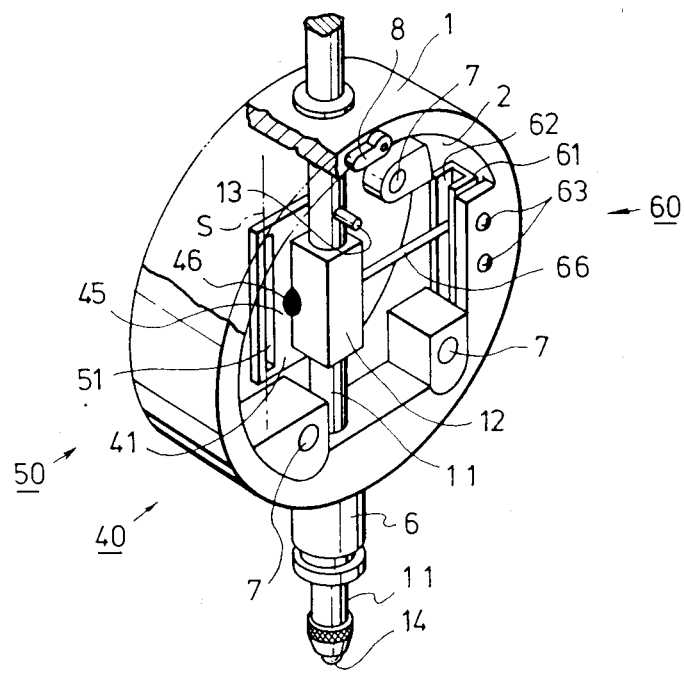
FIG. 1 is a general arrangement view, partially omitted, showing one embodiment of the displacement detecting apparatus according to the present invention.
Figure 2:
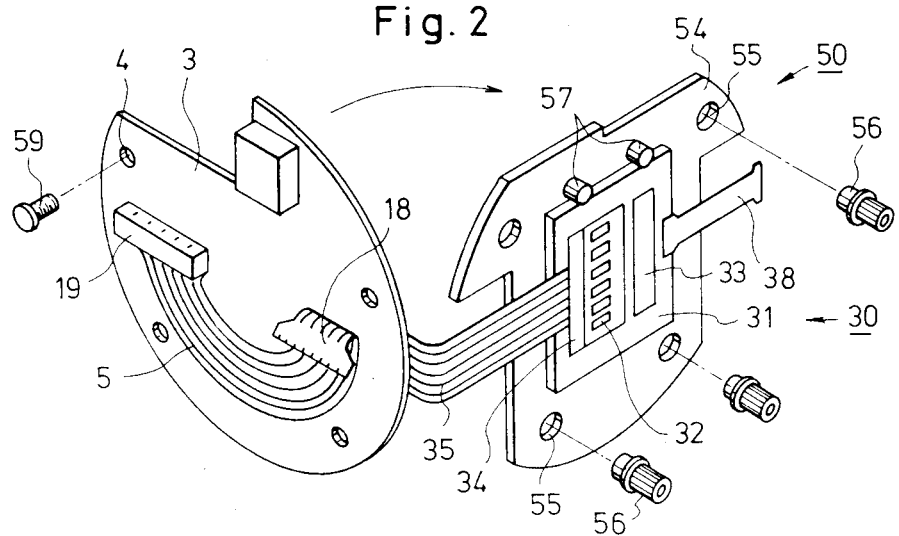

In FIGS. 1 and 2, the movable plate 41 of the second sensing member 40 is fixed to a square-shaped mount member 12 fixed to the spindle 11 as an electric conductor through a highly electrically conductive bonding agent 46. The movable member 41 in this embodiment is formed of an electrical insulator such as a glass insulator. The movable plate 41 is generally covered by an electrically conductive metal such as an electrically conductive layer 45 made of deposited chromium or the like, formed at the surface thereof with electrodes by etching. When respective earth electrodes 43 are connected to the electrically conductive layer 45 formed on the peripheral surfaces of the respective electrodes, earth current is passed through the electrically conductive layer 45 in the rear of the movable plate and electrically conducted to the spindle 11 through the mount member 12, and further, to the case body 1 because the movable plate 41 is generally covered by the electric conductor. The movable plate 41 is provided with a position checker 51 formed of an elongate through hole having a reference line S vertically extending in the drawing.

Figure 3:
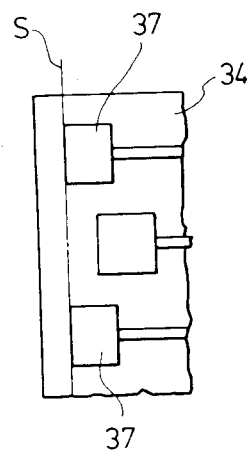
FIG. 3 is a partial enlarged view showing the first sensing member.

On the other hand, the stationary plate 31 forming the first sensing member 30 is fixed to the case body 1 through an adjusting plate 54 and a stationary frame 3. More specifically, the stationary frame 3 is generally disc-shaped, inserted into an inner peripheral edge 2 of the case body 1, and secured to the case body 1 through clamping screws, not shown. The adjusting plate 54 is secured to its stationary frame 3 through screws provided on four sets of eccentric pins 56. The stationary plate 31 is level-aligned by projecting pins 57 and 57 and adhesively fixed to this adjusting plate 54. As a consequence, the eccentric pins 56 inserted at their ends of eccentric pin portions on one side into holes 55 and at their ends on the other side into mounting holes 7 are adjusted such that the reference line S coincides with one end edge line of connecting patterns 37 provided on a terminal portion 34 for applying various phase voltage signals to the respective sending electrodes 32 as shown in FIG. 3 through the elongate through-hole as being the position checker 51 from this side of the paper surface in FIG. 1, and, after the adjusting, the set-screws 59 are threadably coupled to screws provided at the central portions of the eccentric pins, the screws are clamped, and the adjusting plate 54 is fixed onto the stationary frame 3, whereby the reference line S completely coincides with the one end edge line, thus resulting in achieving the positioning between the second sensing member 40 and the first sensing member 30. Here, the four eccentric pins 56 inserted into the four sets of the holes 55 and mounting holes 7, which vary the position of the adjusting plate 54 relative to the stationary frame 3 and the position checker 51 formed by the elongate through-hole formed in the movable plate 41 capable of performing the visual positioning constitute the positioning means 50. Incidentally, electric communications from the sending electrodes 32 and the receiving electrode 33 of the first sensing member 30 to the stationary frame 3 are carried out by flexible wirings 35 and 38, so that the adjusting plate 54 can be rotated relative to the stationary frame 3. Designated at 19 on the stationary frame 3 is a terminal connected to an electronic circuit, not shown. A circularly arcuate flexible wiring 5, when one end thereof is connected to the display means 21, etc. of an outer frame 9 made rotatable relative to the case body 1, can allow the outer frame 9 to rotate.

On the other hand, the parallelism adjusting means 60 is constituted by a guide member 61 made inclinable relative to the case body 1 though adjusting screws 63 and an engageable member 66 projected in the diametral direction of the spindle 11, fixed at the proximal end portion thereof to the mount member 12 and engaged at the forward end portion thereof with a guide groove 62 of the guide member 61, so that the spindle 11 can be slidably guided in the axial direction thereof without being rotated relative to the case body 1. As a consequence, the parallelism adjusting means 60 has a function of locking the rotation of the spindle 11 and a function of parallelism adjusting. More specifically, when the adjusting screws 63 are finely adjusted before or after the positioning work is performed by the positioning means 50, the respective electrodes 32 and 33 of the first sensing member 30 and the coupling and earth electrodes 42 and 43 of the second sensing member 40 can be set to the predetermined values in parallelism.

Incidentally, designated at 8 is a shock absorber of the spindle 11 and 13 a spring hanger for a spring, not shown, to bias the spindle 11 downwardly in the drawing.

OPERATION

Operation of this embodiment will hereunder be described.

First, the assembling steps will be described. The spindle 11 is slidably mounted to the case body 1. The movable plate 41 of the second sensing member 40 is previously fixed to the mount member 12 through an electrically conductive bonding agent in parallel to the axial line of the spindle 11. Here, the adjusting screw 63 of the parallelism adjusting means 60 are linearly moved, whereby the posture of the guide member 61 is adjusted. This posture adjusting is performed such that the spindle 11 can be rectilinearly, vertically, moved, without rotating, through the engageable member 66 engaged with the guide groove 62 of the guide member 61. Incidentally, readjusting may be made after the positioning work by the positioning means 50, which will be described hereunder.

Subsequently, the flexible wiring 35 is flexed into a state where the stationary frame 3 and the adjusting plate 54 are overlapped from the state shown in FIG. 2, whereby both members 3 and 54 are coupled into the case body 1. In this case, when the movable plate 41 and the stationary plate 31 are brought into slightly pressing contact therebetween through spaces having a predetermined thickness, spaces between the respective electrodes can be held more accurately. Then, the stationary frame 3 is fixed to the case body 1, and thereafter, the stationary plate 31 is positioned relative to the movable plate 41 by the positioning means 50. Since this positioning is performed such that, even if the spindle 11 is moved to displace, the area ratio of electrodes between the sending electrodes 32, the receiving electrodes 33 and the coupling electrode 42 is set at a predetermined and constant value, the respective eccentric pins 56 are rotatably adjusted such that the elongate through-hole as being the position checker 51 is visually inspected from the rear surface side of the movable plate 41 (from this side of the paper surface in FIG. 1) and the reference line S as being the end edge of this through-hole coincides with the connecting patterns 37 shown in FIG. 3. After the positioning, the adjusting plate 54 as being held in the adjusted position is secured to the stationary frame 3 through the set-screws 59, and further firmly fixed through a bonding agent as necessary. Thereafter, one end portion 18 of the flexible wiring 5 is connected to the display means 21 and the like and the outer frame 9 is coupled into the case body 1, to thereby complete the assembling.

In the displacement detecting apparatus thus assembled and adjusted, if the spindle 11 is moved to displace, while the measuring element 14 is in contact with an article to be measured, not shown, then a measured value can be read through the display means 21.

As a consequence, in this embodiment, the connecting patterns 37 alignedly provided on the first sensing member 30 and the position checker 51 provided on the movable plate 41 of the second sensing member 40 are visually ascertained, whereby coincidence of both members can be achieved by the positioning means 50. Hence, in contrast to the conventional positioning method wherein the stationary plate 31 of the first sensing member 30 and the movable plate 41 of the second sensing member 40 have been fixed in prediction, respectively, and both members have been checked, disassembled and readjusted from various voltage waveforms obtained by the actual operation, according to the method of the present invention, positioning can be performed quickly and with high accuracy, so that the resolution and accuracy of the detector 100 can be rapidly progressed. The resolution of less than 1 $\mu$m can be achieved. Furthermore, stabilized and reliable measuring is secured and the displacement detecting apparatus as a whole is effectively rendered compact in size. Further, since the positioning means 50 utilizes the connecting patterns 37 highly accurately aligned on the stationary plate 31, no particular finishing only for the positioning is needed, construction is simplified and economical and direct positioning can be performed.

In the parallelism adjusting means 60, the guide groove 62 is provided in the inclinable guide member 61, so that the function of locking the rotation of the spindle 11 and the straight-lined movement of the spindle 11 can be established and the parallelism of the second sensing member 40 relative to the first sensing member 30 can be attained. In addition, such an advantage is offered that the construction of the apparatus according to the present invention is easily worked and economical as compared with the conventional construction wherein the case body 1 is integrally provided therein with the guide groove.

Further, since the detector 100 of the phase discriminating type electrostatic capacity system can be introduced into the displacement detecting apparatus, wherein the spindle moves, such as the conventional electronic dial gauge not having a portion corresponding to the main scale 71, such an advantage can be offered that the displacement detecting apparatus with high accuracy and compact in size can be attained.

Incidentally, in the above embodiment, the straight-lined portion at the end edge of the elongate through-hole formed in the movable plate 41, the elongate through-hole as being the position checker 51, is utilized as the reference line S, however, in short, it suffices to visually inspect the predetermined pattern on the side of the stationary plate 31 from the side of the movable plate 41. Therefore, a curve corresponding to the predetermined pattern, a broken line arranged at regular intervals, a square mark or the like may be adopted. However, if the reference line S is used, then such an advantage can be offered that the positioning work over a wide range can be efficiently performed, while the spindle 11 is moved. In this sense, the position checker 51 may be formed of a colored notch or the like in place of the through-hole, when the movable plate 41 is formed of a light-transmitting material. As the predetermined patterns, the connecting patterns 37, 37 as being the wirings or terminals for charging the respective sending electrodes 32 are used, however, the respective sending electrodes 32 may be directly utilized. In short, patterns indispensable for forming the detector 100 should be adopted. As a consequence, when the detector 100 is of the photoelectric type, optical lattices or the like for detecting an absolute origin should be adopted as the pattern. The patterns are understood to be different from one another in accordance with the principle and system.

As has been described hereinabove, the present invention can offer such outstanding advantages that the construction is simplified, positioning between both sensing members can be quickly performed and a displacement can be detected with high accuracy.

What is claimed is:

1. A displacement detecting apparatus comprising:
   a case body;
   a spindle having a measuring element slidably supported on said case body;
   means for detecting a moving displacement of said spindle in the axial direction thereof, said detecting means including a first sensing member having predetermined patterns formed thereon and a second sensing member opposed to said first sensing member and integrally secured to said spindle;
   a position checker provided on said second sensing member, including a through-hole having a reference line which extends in a direction parallel to the axial direction of said spindle, said position checker allowing visual inspection of the patterns of said first sensing member from a direction opposite to said first sensing member and ascertaining a positional relationship between said second sensing member and said first sensing member; and
   said first sensing member being supported by said case body after said first sensing member is positionally adjusted with said second sensing member secured to said spindle.

2. A displacement detecting apparatus as set forth in claim 1, wherein said position checker is provided on a movable plate integrally formed with said spindle.

3. A displacement detecting apparatus as set forth in claim 2, wherein said movable plate is formed of a light-transmitting material.

4. A displacement detecting apparatus as set forth in claim 1, wherein said first sensing member is fixed into an adjusting plate supported by said case body, and wherein said adjusting plate includes means for adjusting the position of said first sensing member relative to said second sensing member.

5. A displacement detecting apparatus as set forth in claim 4, wherein said means for adjusting includes a plurality of eccentric members.

6. A displacement detecting apparatus as set forth in claim 1, further comprising parallelism adjusting means for adjusting the parallelism between said first and second sensing members.

7. A displacement detecting apparatus as set forth in claim 6, wherein said parallelism adjusting means includes a guide member provided on said case body and an engageable member fixed at the proximal end thereof to a side of said spindle and engaged at the forward end thereof with said guide member.

8. A displacement detecting apparatus as set forth in claim 7, wherein said guide member has an inclinable guide groove means being in parallel to the axial direction of said spindle.

9. A displacement detecting apparatus as set forth in claim 1, wherein:
   said first sensing member includes a stationary plate supported by said case body, and sending electrodes and a receiving electrode, which are provided on said stationary plate;

said second sensing member includes a movable plate integrally formed with said spindle, and coupling electrodes and earth electrodes, which are provided on said movable plate; and said movable plate being formed at the peripheral surface thereof with an electrically conductive layer, and said earth electrodes and said spindle are electrically connected to each other through said conductive layer.

10. A displacement detecting apparatus as set forth in claim 9, wherein said movable plate and said spindle are connected to each other through an electrically conductive bonding agent.

11. A displacement detecting apparatus as set forth in claim 1, including an electronic dial gauge.

* * * * *